United States Patent [19]

Stickler

[11] Patent Number: 4,869,013
[45] Date of Patent: Sep. 26, 1989

[54] SNAG-PRUFFER

[76] Inventor: Rexford W. Stickler, R.D. 1, Box 77, Wellsburg, N.Y. 14894-9748

[21] Appl. No.: 84,811
[22] Filed: Aug. 13, 1987
[51] Int. Cl.$^4$ .............................................. A01K 83/00
[52] U.S. Cl. ....................................... 43/42.4; 43/43.2
[58] Field of Search .................... 43/42.4, 25.2, 42.04, 43/42.1, 42.28, 43.2, 42.212

[56] References Cited

U.S. PATENT DOCUMENTS

| 539,149 | 5/1895 | Shattuck . | |
|---|---|---|---|
| 798,575 | 8/1905 | Eastman . | |
| 1,191,031 | 7/1916 | Peters | 43/43.2 |
| 1,516,940 | 11/1924 | Winchell | 43/42.4 |
| 2,123,598 | 7/1936 | Eliason | 43/42.04 |
| 2,185,507 | 4/1937 | Knapp | 43/43.2 |
| 2,513,391 | 7/1950 | Bemis | 43/42.4 |
| 2,589,435 | 3/1952 | Roeben . | |
| 2,590,167 | 3/1952 | Frasano et al. | 43/212.4 |
| 2,615,277 | 10/1952 | Hayden . | |
| 2,735,210 | 2/1956 | Hinkal . | |
| 2,948,079 | 9/1960 | Malchert | 43/42.4 |
| 3,274,726 | 9/1966 | Oney . | |
| 3,562,948 | 7/1968 | Santo et al. | 43/43.2 |
| 3,683,541 | 8/1972 | Cather . | |
| 3,731,419 | 5/1973 | Candy | 43/42.28 |

FOREIGN PATENT DOCUMENTS 2606305  8/1977  Fed. Rep. of Germany ....... 43/43.2

Primary Examiner—Nicholas P. Godici
Assistant Examiner—Karen Skillman
Attorney, Agent, or Firm—Ralph R. Barnard

[57] ABSTRACT

A weed guard for attachment to the base of the eye of a fishhook having one, two, or three hooks for the purpose of preventing the hooks from snagging on weeds and like marine growth during use in areas having underwater or surface weed growth. The weed guard consists of a disc-shaped hub with a locking slot selected in size to receive and hold the two faces of the eye of the fishhook. Wire loops which are attached to and peripherally spaced around the hub correspond to the number of hooks on the fishhook and extend down to engage the inside of the hook under the barb of the hook.

7 Claims, 2 Drawing Sheets

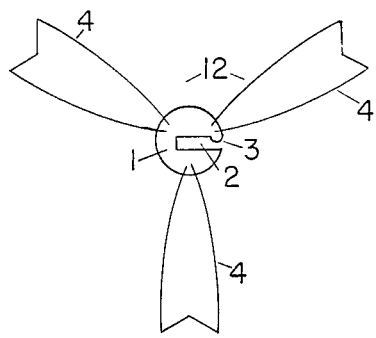
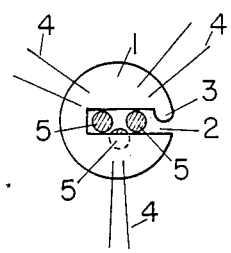
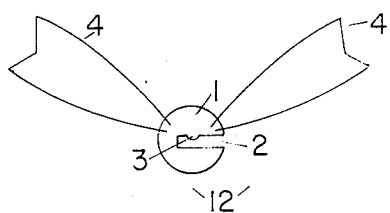
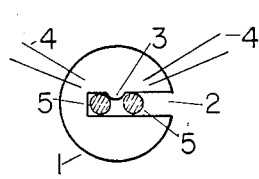
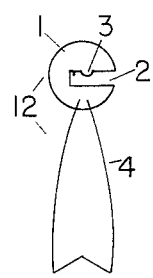
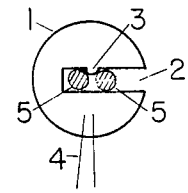

SNAG-PRUFFER

BACKGROUND OF THE INVENTION

The invention relates to an improvement in devices used to guard against the snagging of weeds on fishhooks commonly used with underwater and surface fishing lures. While numerous weed guards have been suggested in the literature or are available on the market, they are deficient in many respects. This invention seeks to solve the problems which remain with the prior art devices.

The need for a weed guard has long been recognized by fishermen who fish in waters containing weed beds, lily pads, and like marine growth. It is necessary that the hooks be protected against weeds during normal horizontal retrieve on the surface or submerged, and during vertical jigging, as well as while trolling. Thus, it is an object of this invention to provide a weed guard which attaches onto the barb of the hook, assuring that the hook can pass through weeds in any orientation.

It is a further object of the present invention to provide a weed guard which does not distort the intended action and function of the lure. The weed guard as taught is lightweight and has little significant resistance to the water. Additionally, the guard offers very little and no significant resistance to the mouth of the fish engaging the hook, since the guard flexes away from the barb of the hook when the fish strikes.

It is a further object of the present invention to provide a weed guard which is readily attachable to and removeable from the hook(s) of the lure. Most prior art devices are either permanently attached to the fishhook or attachable only by removing the hook from the lure for the purpose of slipping the device over the eye of the hook. Attachment of the weed guard to the eye of the hook via a hub with a locking slot allows flexibility for use or nonuse of the weed guard without requiring detachment of the hook from the lure. Yet, the weed guard is substantially securely locked against the rotational and longitudinal movement by a locking slot which does not interfere with the full use of the hook eye. The resilient wire material and the design of the wire loop guard allow the guard assembly to be put on a hook of any size including a very small one. Furthermore, the guard concept works with one hook or with a plurality of hooks.

It is a further object of the present invention to protect a fish, such as an undersized game fish, which is required by law to be released if caught. Such a fish, with a hook and guard impaled deep within its throat would sustain mortal damage upon attempted removal of the hook and guard. Rather than removing the hook, it would be clipped loose from the lure, and the fish would be released with the hook and guard in place. Therefore, the use of a wire loop guard, as opposed to a plastic or rubber one, allows for quicker disintegration of a hook and guard left within a fish.

SUMMARY OF THE INVENTION

The present invention is a detachable looped wire weed guard, which is readily adaptable to any size, multiple or single hook used with a fishing lure.

The weed guard disclosed herein attaches onto the barb of each individual fishhook. Thus, the hooks are prevented from snagging on weeds during use in areas having underwater or surface weed growth, which is known to serve as home for numerous species of freshwater game fish. The barb of the hook is prevented from snagging on weeds, regardless of the type of underwater or surface movement. The guard is of such a lightweight and flexible type as to leave the action and function of the lure undistorted.

The use of a wire loop guard, as opposed to a plastic or rubber one. allows for quicker disintegration of a hook and guard which is left within a fish.

BRIEF DESCRIPTION OF THE DRAWINGS

FIGS. 4, 5, and 6 are plan views showing the preferred embodiment of the invention made for treble, double and single hooks respectively.

FIGS. 7, 8, and 9 show a cross sectional view of the bottom of the eye of the hook which extends into the shank with the hub of the weed guard attached thereto, illustrating the positioning of the locking dimple(s).

DESCRIPTION OF THE INVENTION

Figure 1:
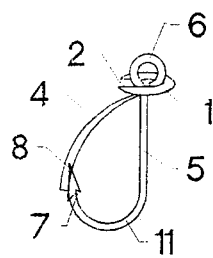
FIGS. 1, 2, and 3 are side elevations showing the invention mounted in place on a hook, with the wire loop(s) of the guard attached to the barb(s) of single, double, and treble hooks respectively.

In each figure the reference numbers are the same, thus each number will always refer to the same part. Referring to the drawings, numeral (11) generally designates a conventional hook comprising an elongated shank (5) which is provided with an eye (6) at one (upper) end, by means of which said hook may be secured to a fish lure, and whose other end carries one, two, or three individual fishhook points (8) which are evenly spaced apart in the case of double and treble fishhooks, and which terminate outwardly in points having barbs (7).

Figure 2:
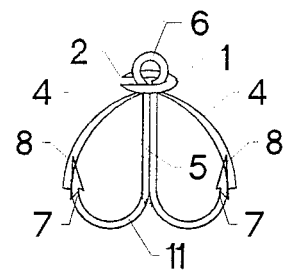

The invention is illustrated in its preferred embodiment. Its attachment may best be understood by looking at FIGS. 1, 2, and 3, with reference to FIGS. 4 through 9 for the actual appearance and arrangement of parts.

In FIG. 4 the invention is shown with three wire loops (4) which are attached to and peripherally spaced around a disc-shaped hub (1), having a locking slot (2) with one or two locking dimples (3). Likewise, FIGS. 5 and 6 respectively, show the invention as it would appear for use on double and single hooks, having the corresponding number of radially extending and circumferentially spaced loops. The wire loops (4) of the weed guard (12) are preferably made of standard music wire (spring tempered wire).

Figure 3:
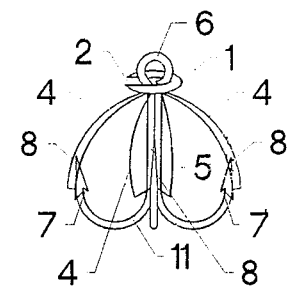

In FIG. 3 the invention is shown attached to a treble hook, which is easily accomplished by pushing the locking slot (2) of the hub (1) onto the lower portion of the eye (6) of the hook. Each of the wire loops (4), peripherally spaced around the hub (1), arch radially outwardly and downwardly from the hub (1) and hook onto the barb (7) of an individual hook point (8). When the barbs of the hook points are so engaged, an effective weed guard for said hooks is provided, capable of preventing snagging of said hooks or any one of them by or with weeds, lily pad roots, and like marine growth when a lure carrying a treble hook having a weed guard attached to its shank is cast into water having such growth as aforesaid and particularily during retrieval of the lure. Consequently, the hook can pass through weeds in any orientation.

The engagement of the wire loop (4) behind the barb (7) is such that it is held securely by spring tension, yet it is flexible enough to be easily disengaged by the mouth of a biting fish. The diameter of the wire used in the loop (4) varies with the length of the loop (4), which is determined by the size of the hook (11). Thus, an appropriate weed guard is made for every size of hook.

Figure 10:
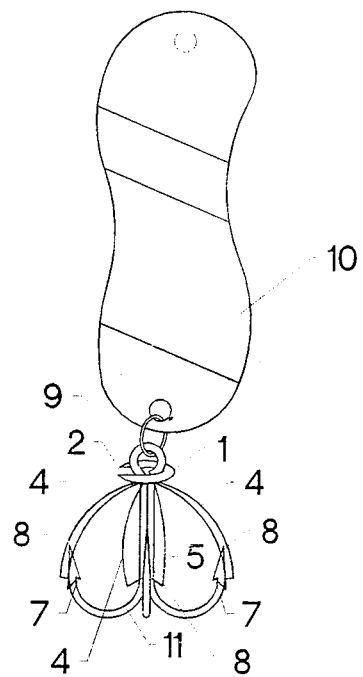
FIGS. 10 and 11 show the invention in place on a hook which is attached to a lure.
Figure 11:
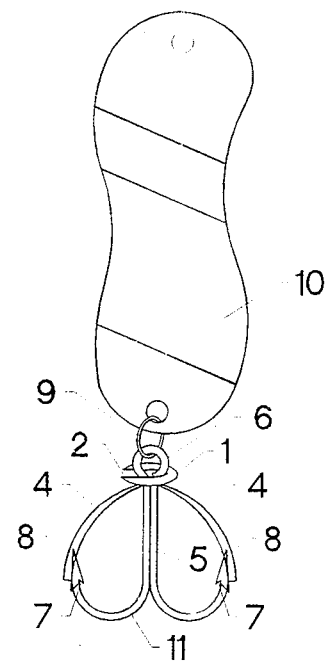

The eye (6) of the hook is attached by a mechanism (9) to a fishing lure (10) as illustrated in FIGS. 10 and 11. The hub (1) is thin enough so as not to reduce the opening of the eye (6), which would disturb its proper functioning when attached to the lure. The weed guards are to be manufactured to fit all sizes of standardized fishhooks. Preferably, all hooks would be sold with the weed guard attached, being easily dispensed with during fishing in relatively open water. However, since the weed guard is thin and lightweight and does not interfere with the intended action and function of the lure, it need not ever be removed.

The functioning of the locking slot (2) is more clearly illustrated in FIG. 7. When the locking slot (2) is pushed in place at the base of the eye (6), a locking dimple (3) placed at the far end of the locking slot abuts against the outer part of the shank (5), which forms the eye of the hook. Thus, it is impossible for the guard to rotate out of operative position.

The foregoing description has been directed to particular embodiments of the invention in accordance with the requirements of the Patent Statutes for the purpose of illustration and explanation. It will be apparent, however, to those skilled in this art that modifications and changes will be possible without department from the scope and spirit of the invention. It is intended that the following claims be interpreted to embrace all such modifications and changes.

I claim:

1. A weed guard for attachment to the base of the eye of fishhook means having at least two faces in the lower portion of its eye and having at least one hook, comprising: a disc-shaped hub with a locking slot open to the perimeter of said hub; said hub locking onto said eye to prevent rotation of said weed guard; said slot selected in size to receive and hold the two faces of the lower portion of the eye of said fishhook means and including a dimple means to lock the slot of the dish-shaped hub against the two faces of the eye; said lower portion of the eye acting as a key, locking said hub in place at the base of said eye; resilient guard means constructed as a wire loop extending generally arcuate from said disc means out and down to engage the inside of the hook under the barb of said hook.

2. The weed guard of claim 1, wherein fishhook means includes three hooks.

3. The weed guard of claim 1, wherein fishhook means includes two hooks.

4. The weed guard of claim 1, wherein the fishhook means is attached by its eye to lure means.

5. A weed guard in combination with a fishhook, comprising: A fishhook having an eye means having two faces in the lower portion of its eye, a shank and a prong with a hook point and barb, a disc shaped hub with a locking slot open to the perimeter of said hub attached to said shank at the base of the eye, said slot selected in size to receive and hold the two faces of the lower portion of the eye of said fishhook means and including a dimple means to lock the slot of the disc shaped hub against the two faces of the eye, said hub having a resilient wire loop projecting outward therefrom, said loop extending downwardly to engage said barb of said hook.

6. A weed guard in combination with a fishhook, comprising: A double fishhook having an eye, two shanks, and two prongs each with a hook point and barb, a disc shaped hub with a locking slot open to the perimeter of said hub attached to said shanks at the base of the eye, said slot selected in size to receive and hold the two faces of the lower portion of the eye of said fishhook means and including a dimple means to lock the slot of the disc shaped hub against the two faces of the eye, said hub having two resilient wire loops projecting outward therefrom, each of said loops extending downwardly to engage said barbs of said hooks.

7. A weed guard in combination with a fishhook, comprising: A treble fishhook having an eye, three shanks, and three prongs each with a hook point and barb, a disc shaped hub with a locking slot open to the perimeter of said hub attached to said shanks at the base of the eye, said slot selected in size to receive and hold the two faces of the lower portion of the eye of said fishhook means and including a dimple means to lock the slot of the disc shaped hub against the two faces of the eye, said hub having three wire loops projecting therefrom, each of said loops extending downwardly to engage said barbs of said hooks.

* * * * *